US012562771B2

(12) United States Patent
Kim et al.

(10) Patent No.: US 12,562,771 B2
(45) Date of Patent: Feb. 24, 2026

(54) TRANSCEIVER AND WIRELESS COMMUNICATION APPARATUS INCLUDING THE SAME

(71) Applicant: SAMSUNG ELECTRONICS CO., LTD., Suwon-si (KR)

(72) Inventors: Young Min Kim, Suwon-si (KR); Hongjong Park, Suwon-si (KR); Sangmin Yoo, Suwon-si (KR); Jongwon Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 18/345,137

(22) Filed: Jun. 30, 2023

(65) Prior Publication Data

US 2024/0162932 A1 May 16, 2024

(30) Foreign Application Priority Data

Nov. 10, 2022 (KR) ........................ 10-2022-0149396

(51) Int. Cl.
*H01Q 1/50* (2006.01)
*H01Q 21/00* (2006.01)
*H04B 1/40* (2015.01)

(52) U.S. Cl.
CPC ..................................... *H04B 1/40* (2013.01)

(58) Field of Classification Search
None
See application file for complete search history.

(56) References Cited

U.S. PATENT DOCUMENTS

| | | | |
|---|---|---|---|
| 6,784,837 B2 | 8/2004 | Revankar et al. | |
| 6,894,657 B2 | 5/2005 | Carey | |
| 7,126,541 B2 * | 10/2006 | Mohamadi | H01Q 3/26 |
| | | | 343/700 MS |
| 7,697,958 B2 * | 4/2010 | Mohamadi | H04B 7/1555 |
| | | | 455/24 |
| 7,728,784 B2 * | 6/2010 | Mohamadi | H04B 7/0617 |
| | | | 333/24.1 |
| 7,742,000 B2 * | 6/2010 | Mohamadi | H01Q 21/0087 |
| | | | 343/700 MS |
| 7,791,556 B2 * | 9/2010 | Mohamadi | H03F 3/604 |
| | | | 343/795 |

(Continued)

FOREIGN PATENT DOCUMENTS

CN        102200574 A        9/2011

OTHER PUBLICATIONS

Nana Ma et al: "Design of passive vector sum phase shifters", Microwave and Millimeter Wave Technology (ICMMT), 2012 International Conference on, IEEE, May 5, 2012 (May 5, 2012), pp. 1-4.*

(Continued)

*Primary Examiner* — Tuan A Tran
(74) *Attorney, Agent, or Firm* — Morgan, Lewis & Bockius LLP

(57) ABSTRACT

A transceiver includes a phase shifter configured to adjust phase of a receive signal input at a first node of the phase shifter to provide an output receive signal output from a second node of the phase shifter in a receive mode, and to adjust phase of a transmit signal input at the first node to provide an output transmit signal at the second node in a transmit mode.

18 Claims, 11 Drawing Sheets

(56) References Cited

U.S. PATENT DOCUMENTS

| | | | | |
|---|---|---|---|---|
| 7,855,695 | B2 * | 12/2010 | Mohamadi | H01P 1/184 |
| | | | | 343/700 MS |
| 8,102,329 | B2 * | 1/2012 | Mohamadi | H01Q 21/062 |
| | | | | 343/824 |
| 9,473,195 | B2 | 10/2016 | Zhan et al. | |
| 9,843,107 | B2 * | 12/2017 | Corman | H01Q 3/26 |
| 10,163,889 | B2 * | 12/2018 | Mayer | H03H 7/19 |
| 10,200,100 | B2 * | 2/2019 | Kim | H04B 7/0639 |
| 10,298,190 | B2 | 5/2019 | Bulzacchelli et al. | |
| 10,566,952 | B1 | 2/2020 | Lin et al. | |
| 10,714,830 | B2 | 7/2020 | Jackson et al. | |
| 10,790,563 | B1 * | 9/2020 | Schwab | H04B 1/0458 |
| 10,886,612 | B2 | 1/2021 | Ngai et al. | |
| 10,983,192 | B2 | 4/2021 | Ainspan et al. | |
| 11,018,747 | B2 | 5/2021 | Friedman et al. | |
| 11,316,489 | B2 | 4/2022 | Patel et al. | |
| 12,095,495 | B2 * | 9/2024 | Biglarbegian | H04B 1/44 |
| 12,250,019 | B2 * | 3/2025 | Biglarbegian | H04B 1/0078 |
| 2013/0286960 | A1 * | 10/2013 | Li | H04B 7/0684 |
| | | | | 370/329 |
| 2020/0021024 | A1 | 1/2020 | Park et al. | |
| 2020/0287259 | A1 * | 9/2020 | Schwab | H01Q 3/30 |
| 2020/0403673 | A1 * | 12/2020 | Bontu | H04L 25/03343 |
| 2021/0083914 | A1 * | 3/2021 | Cao | H04L 5/0053 |
| 2021/0234591 | A1 * | 7/2021 | Eleftheriadis | H04W 52/0206 |

OTHER PUBLICATIONS

KR 20150081740, Jul. 15, 2015, Korea, Jung et al., "Method and Apparatus for Transceiving for Beam Forming in Wireless Communication System", English translation.*

CN 109687885, Jan. 7, 2022, China, Jin et al., "Receiver, Low Noise amplifier And Wireless Communication Device", English translation.*

Partial European Search Report dated Mar. 12, 2024 for related European Patent Application No. 23197451.0 (14 pages).

Agrawal, et al., "Beamformer Architectures for Active Phased-Array Radar Antennas", IEEE Transactions on Antennas and Propagation, vol. 47, No. 3, Mar. 1999, pp. 432-442.

* cited by examiner

100

100

100

100

100

100

TRANSCEIVER AND WIRELESS COMMUNICATION APPARATUS INCLUDING THE SAME

CROSS-REFERENCE TO RELATED PATENT APPLICATION(S)

This application claims the benefit of Korean Patent Application No. 10-2022-0149396 filed on Nov. 10, 2022, in the Korean Intellectual Property Office, the disclosure of which is incorporated herein by reference in its entirety.

TECHNICAL FIELD

The present disclosure relates to a transceiver and a wireless communication apparatus including the same, and more particularly, to a transceiver including a phase shifter, that may be used in a phased array antenna.

DISCUSSION OF RELATED ART

Phased array antenna technology and beam forming technology have been widely applied to wireless communication systems today to form directive beams. To realize the beam forming technology using a multi-antenna array, a phase shifter that shifts the phase of a wireless signal may be coupled to each antenna ("antenna element") of the array. In some designs, a phase shifter is used for each of a plurality of antenna elements, which increases the size and complexity of front end communication chips in the phased array antenna transceiver.

Research and development has progressed in various ways to reduce an area occupied by a phase shifter(s) within a chip. Phase shifters may be embodied in various ways such as switching, reflecting, or vector sum, but a difference in power consumption, linearity, or a noise characteristic may occur, depending on the type of phase shifter and/or the approach taken to reduce space.

SUMMARY

Embodiments of the present disclosure provide a transceiver, in which an area of a chip may be reduced while a linearity characteristic and/or a noise characteristic may be maintained or improved; and a wireless communication apparatus including the same.

According to an aspect of the present disclosure, a transceiver includes a phase shifter configured to adjust phase of a receive signal input at a first node of the phase shifter to provide an output receive signal at a second node of the phase shifter in a receive mode, and to adjust phase of a transmit signal input at the first node to provide an output transmit signal at the second node in a transmit mode.

According to an aspect of the present disclosure, a transceiver includes: a receive chain configured to receive a receive signal of a first frequency band through an antenna and convert the receive signal into a baseband receive signal; and a transmit chain configured to convert a baseband transmit signal into a transmit signal of the first frequency band and transmit the transmit signal through an antenna, wherein the receive chain and the transmit chain include a shared vector sum passive phase shifter.

According to an aspect of the present disclosure, a wireless communication apparatus includes: a transceiver configured to operate in one of a receive mode or a transmit mode at a given time, in response to a mode signal; and a communication modem configured to generate the mode signal and provide the mode signal to the transceiver, wherein the transceiver comprises a phase shifter configured to adjust phase of a receive signal input at a first node of the phase shifter to provide an output receive signal at a second node of the phase shifter in the receive mode, and to adjust phase of a transmit signal input at the first node to provide an output transmit signal at the second node in the transmit mode.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Hereinafter, embodiments of the present disclosure may be described in detail and clearly to such an extent that a person of ordinary skill in the art can readily implement the embodiments.

Figure 1:
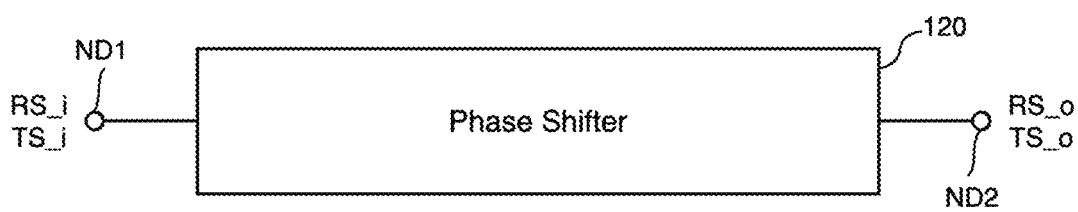
FIG. 1 illustrates a transceiver according to an embodiment of the present disclosure.
Figure 2A:
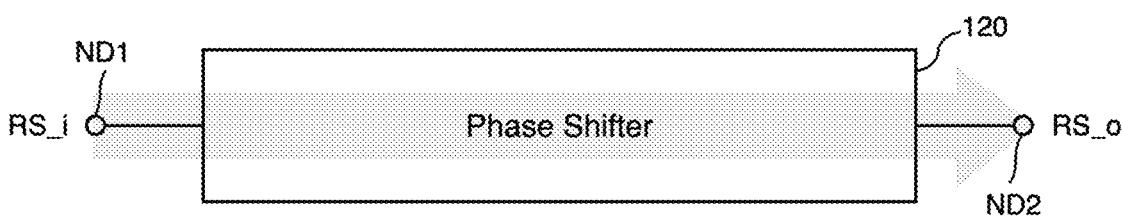
FIGS. 2A and 2B illustrate operation of the transceiver of FIG. 1 according to a transmit/receive mode.
Figure 2B:
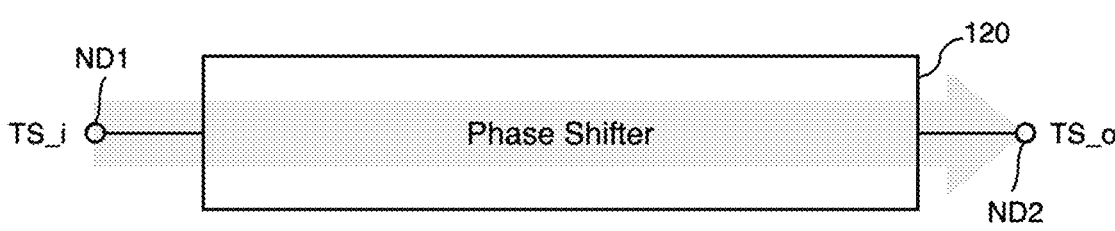

FIG. 1 illustrates a transceiver 100 according to an embodiment of the present disclosure and FIGS. 2A and 2B illustrate operations of the transceiver 100 of FIG. 1 according to a transmit/receive mode.

First, referring to FIGS. 1 and 2A, the transceiver 100 according to an embodiment of the present disclosure includes a phase shifter 120.

When the transceiver 100 is in a receive mode, a receive signal RS_i is input to a first node ND1 of the phase shifter 120, phase thereof is adjusted, and a phase adjusted receive signal is output from a second node ND2. The first node ND1 and the second node ND2 of the phase shifter 120 may respectively denote an input node and an output node. Hereinafter, unless otherwise mentioned, for convenience of description, a receive signal input to the first node ND1 of the phase shifter 120 may be referred to as an input receive signal RS_i and a receive signal output from the second node ND2 of the phase shifter 120 may be referred to as an output receive signal RS_o. In a receive mode, the input receive signal RS_i is input to the first node ND1, processed by the phase shifter 120 and then the output receive signal RS_o is output from the second node ND2 as shown in the direction of the arrow.

Referring to FIGS. 1 and 2B, when the transceiver 100 is in a transmit mode, a transmit signal TS_i is input to the first node ND1 of the phase shifter 120, which adjusts the phase thereof and outputs the phase shifted signal at the second node ND2. Using similar nomenclature as above, a transmit signal input to the first node ND1 may be referred to as an input transmit signal TS_i and a transmit signal output from the second node ND2 may be referred to as an output transmit signal TS_o. In a transmit mode, the input transmit signal TS_i is input to the first node ND1, processed by the phase shifter 120, and then the output transmit signal TS_o is output from the second node ND2 as shown in the direction of the arrow.

Hence, a single phase shifter 120 used to adjust the phase may be shared by the transceiver 100 according to an embodiment of the present disclosure in a receive mode and a transmit mode. Accordingly, in the transceiver 100, an area thereof may be reduced relative to that of related art transceiver configurations, whereby transceiver 100 may be miniaturized and/or highly integrated. Also, in the transceiver 100, signal processing, in which the input receive signal RS_i is phase shifted to provide the output receive signal RS_o and the input transmit signal TS_ is phase shifted to provide the output transmit signal TS_o, may be performed in the same direction in both receive mode and transmit mode.

To adjust the phase of the input receive signal RS_i and the input transmit signal TS_i unidirectionally in both receive mode and transmit mode, the phase shifter 120 may use an active device to perform variable amplification for the input receive signal RS_i and the input transmit signal TS_i. For example, the phase shifter 120 may be a vector sum passive phase shifter. In this regard, the phase shifter 120 may secure a gain without a loss otherwise present in related art phase shifters while a size of the phase shifter 120 itself is reduced relative to the related art phase shifters. Accordingly, noise and linearity characteristics may be improved by the phase shifter 120 according to an embodiment of the present disclosure.

Figure 3:
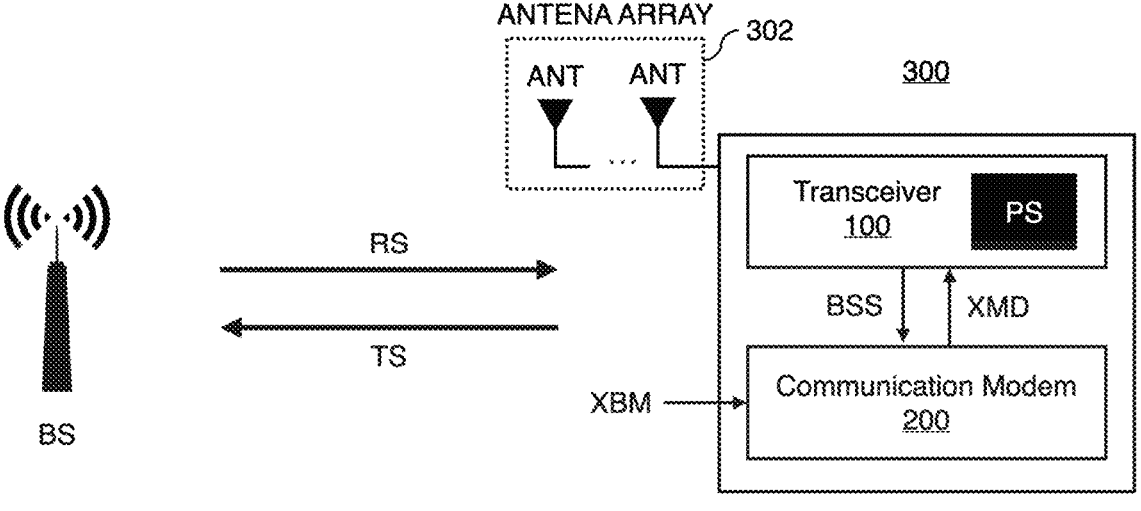
FIG. 3 illustrates communication between a wireless communication apparatus and a base station according to an embodiment of the present disclosure.

FIG. 3 illustrates communication between a wireless communication apparatus 300 and a base station BS according to an embodiment of the present disclosure.

Referring to FIGS. 1 and 3, the wireless communication apparatus 300 may communicate with the base station BS. The wireless device 300 is a type of a user equipment (UE) and may be referred to as a device, a mobile station MS, a mobile equipment ME, or a terminal. The base station BS may be referred to as a base transceiver station (BTS), a Node B(NB), an evolved node B eNodeB (eNB), an access point (AP), or 5G NodeB (gNB). Also, the base station BS may be formed of a main base station and an auxiliary base station. In this case, the main base station may be referred to as a macro base station, a primary base station or PCell and the auxiliary base station may be referred to as a small base station, a secondary base station, or SCell.

The wireless communication apparatus 300 (interchangeably hereafter, "UE 300") may communicate with the base station BS by using radio waves in a superhigh frequency band. As data traffic explosively increases in a mobile environment, there may be limitations in communication service provided by Long Term Evolution (LTE) or LTE-Advanced (LTE-A) where transmission bandwidth per single carrier is limited to 20 MHz at the maximum. In this regard, $5^{th}$ generation (5G) communication system has been introduced for superhigh frequency band communication in the range from a few GHz to about 100 GHz. Here, radio waves of the superhigh frequency band may be millimeter (mm) wave frequencies having a wavelength of few nm. At a selected frequency for communication (whether at a mm wave or microwave frequency band), a half duplex, time division duplexing (TDD) scheme may be applied by the UE 300 and the base station BS to divide downlink time slots and uplink time slots with respect to the same frequency.

While UE 300 communicates with, for example, the base station BS by using millimeter wave frequencies above 30 GHz, UE 300 may process a receive signal RS or a transmit signal TS, to which the beam forming technology is applied, to solve problems related to forming beams with high directivity, low object penetration capacity, and high propagation loss generated in the corresponding frequency. When the beam forming technology is applied, radiation energy of the receive signal RS and the transmit signal TS may concentrate on a destination point so that its arrival distance may be increased and interference may be reduced.

In this regard, the UE 300 may include the transceiver 100 and a communication modem 200. The transceiver 100 may operate in either the receive mode or the transmit mode at any given time, in response to a mode signal XMD. For example, the mode signal XMD may have a first logic level in the receive mode and a second logic level in the transmit mode. The transceiver 100 may include the phase shifter 120 described above.

As described above, the phase shifter 120 may adjust or shift the phase of the input receive signal RS_i or the input transmit signal TS_i between first and second reference nodes ND1 and ND2 in both the receive and transmit paths. (The amount of phase shift provided in the receive and transmit paths may be the same or different, depending on the design of the overall antenna system of UE 300, e.g., considering the frequencies used on transmit and receive, desired directions of beams formed on transmit vs. receive, calibration of amplifiers, etc.) Thus, when the UE 300 receives the receive signal RS_i from the base station BS, the phase shifter 120 may adjust the phase of the input receive signal RS_i input to the first node ND1 and output the output receive signal RS_o at the second node ND2. Also, when the UE 300 is to transmit the transmit signal TS to the base station BS, the phase shifter 120 may adjust the phase of the input transmit signal TS_i input to the first node ND1 and output the output transmit signal TS_o through the second node ND2.

Accordingly, UE 300 may communicate with the base station BS by using the receive signal RS and the transmit signal TS both having optimal signal strength. Although not illustrated, UE 300 may apply the technology having the same purpose as above to communicate with other wireless communication apparatus by using signals having optimal signal strength.

The communication modem 200 may generate and transmit the mode signal XMD to the transceiver 100. In response to the mode signal XMD, the input receive signal RS_i or the input transmit signal TS_i may be processed in the phase shifter 120.

The communication modem 200 may generate the mode signal XMD based on a beam forming control signal XBM received from the base station BS through a Physical Downlink Control Channel (PDCCH). The beam forming control signal XBM may include information indicating a beam forming method and information on phase transition made by beam forming and may be defined as a format of Downlink Control Information (DCI) for downlink scheduling.

The DCI may include allocation information transmitted from the base station BS. The allocation information may be a signal used to allocate a physical channel resource block to UE 300 by the base station BS based on a Channel Quality Indicator (CQI) reported by UE 300. UE 300 may receive the physical channel resource block allocated for the Physical Downlink Shared Channel (PDSCH) based on the allocation information. However, the present disclosure is not limited thereto and the beam forming control signal XBM may be transmitted from the base station BS in various forms.

The antenna ANT may be an antenna element of an antenna array 302 (a phased array antenna) comprising a plurality of antenna elements ANT, where each antenna element may be coupled to a respective transceiver 100 with a phase shifter 120. In this manner, the antenna array 302 may implement beam forming and beam steering through the collective antenna elements. Examples of the transceiver 100 and phase shifter 120 are described hereafter.

Figure 4A:
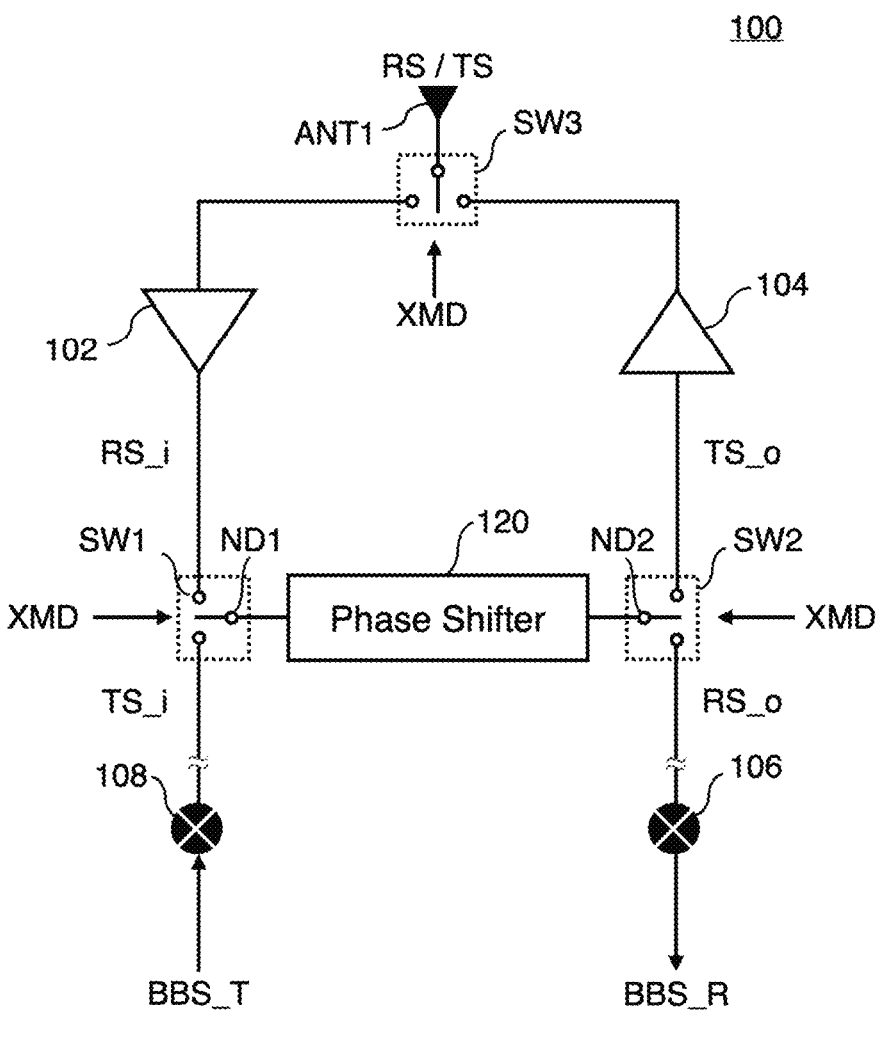
FIGS. 4A and 4B illustrate transceivers respectively including a receive chain and a transmit chain according to an embodiment of the present disclosure.
Figure 4B:
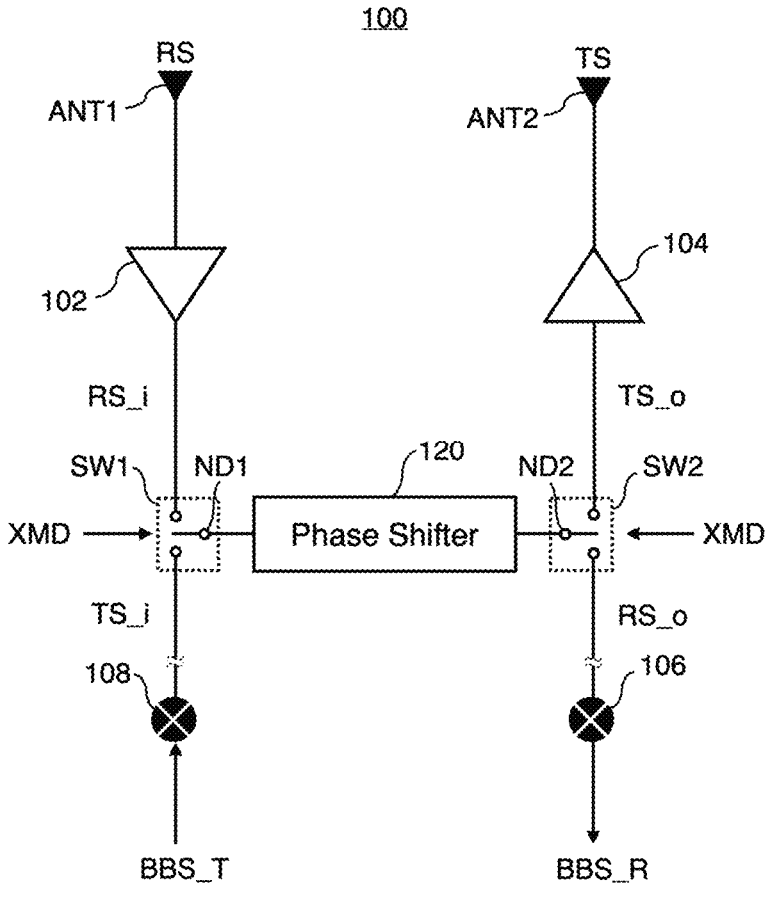

FIGS. 4A and 4B illustrate respective embodiments of the transceiver 100. The transceiver of FIG. 4A transmits and receives through a common antenna whereas the transceiver of FIG. 4B transmits and receives through different respective antennas.

First, referring to FIG. 4A, the receive chain of the transceiver 100 may receive the receive signal RS through a first antenna ANT1 and convert the receive signal RS into a baseband receive signal BBS_R. The receive signal RS may be signal in a first frequency band, e.g., a mm wave band.

The receive chain may include a low noise amplifier (LNA) 102, the phase shifter 120, and a receive mixer 106. When the mode signal XMD indicates the receive mode, the LNA 102 may amplify the receive signal RS received from the first antenna ANT1 and output the amplified receive signal RS to the phase shifter 120. The first antenna ANT1 may be one of a plurality of antennas included in the antenna array 302 in the wireless communication apparatus 300 of FIG. 3. The LNA 102 may amplify the receive signal RS with minimal added noise. A frequency filter (not shown) such as a bandpass filter may be connected in series with the LNA 102 in the receive chain. It is noted that in other embodiments, the LNA 102 may be omitted and substituted with a frequency filter in the receive chain.

The input receive signal RS_i may be output from the LNA 102 and input to the first node ND1 of the phase shifter 120. As described above, in the receive mode, the phase shifter 120 may adjust the phase of the input receive signal RS_i input to the first node ND1 and output the output receive signal RS_o through the second node ND2.

The receive mixer 106 may downconvert the output receive signal RS_o output from the phase shifter 120, where this downconversion may encompass the receive mixer 106 downconverting a combined receive signal comprising a plurality of output receive signals RS_o. A signal (not shown) having a frequency used for the downconversion may be applied to the receive mixer 106. It is noted that the output receive signal RS_o may be combined with other output receive signals RS_o from other receive chains of the UE 300 by a combiner (e.g., 140 of FIG. 8, discussed later), to form the combined receive signal that is applied to the receive mixer 106. Thus, the receive mixer 106 may be shared by at least one other receive chain. The baseband signal BBS_R output from the receive mixer 106 may be input to the communication modem 200 of FIG. 3.

The transmit chain may convert the baseband signal BBS_T into the transmit signal TS and output the transmit signal TS through the first antenna ANT1. The transmit signal TS may be a mm wave signal of the first frequency band, or a slightly different frequency band.

For example, the transmit chain may include a transmit mixer 108, the phase shifter 120, and a power amplifier 104. When the mode signal XMD indicates the transmit mode, the transmit mixer 108 may upconvert the baseband signal BBS_T to the input transmit signal TS_i. The baseband signal BBS_T input to the transmit mixer 108 may be transmitted from the communication modem 200 of FIG. 3. A signal (not shown) having a frequency used for the upconversion may be applied to the transmit mixer 108. Note that the transmit mixer 108 may be shared by at least one other transmit chain. In other words, a divider (e.g., 160 of FIG. 8 discussed later), sometimes referred to as a distribution network, may be included within the UE 300 to divide an input transmit radio frequency (RF) signal output from the transmit mixer 108 into multiple divided RF transmit signals, where one of the divided RF transmit signals may be the input transmit signal TS_i, and the other divided RF transmit signals are routed to other respective transceivers 100.

The input transmit signal TS_i may be output from the transmit mixer 108 and input to the first node ND1 of the phase shifter 120. As described above, in the transmit mode, the phase shifter 120 may adjust the phase of the input transmit signal TS_i input to the first node ND1 and output the output transmit signal TS_o through the second node ND2.

The receive chain and the transmit chain of the transceiver 100 may share the phase shifter 120 so that the phase shifter 120 may operate as a part of the receive chain in the receive mode and operate as a part of the transmit chain in the transmit mode. As described above, when TDD is applied for the communication, the receive chain and the transmit chain may be activated in different respective time slots. Accordingly, although the phase shifter 120 is shared by the receive chain and the transmit chain, the times at which the phase shifting occurs during receive and transmit may differ from each other. Thus, the receive and transmit operations may be suitably performed to achieve a desired performance objective.

The transceiver 100 may include a first switch SW1 and a second switch SW2 to facilitate the activation of the transmit chain and the receive chain during different times. The first switch SW1 may connect the first node ND1 of the phase shifter 120 to either the output of the LNA 102 or the transmit mixer 108, in response to the mode signal XMD. The second switch SW2 may connect the second node ND2 to either the receive mixer 106 or the input of the power amplifier 104.

For example, when the mode signal XMD indicates the receive mode, the first switch SW1 may connect the first node ND1 to the LNA 102 and the second switch SW2 may connect the second node ND2 to the receive mixer 106. When the mode signal XMD indicates the transmit mode, the first switch SW1 may connect the first node ND1 to the transmit mixer 108 and the second switch SW2 may connect the second node ND2 to the power amplifier 104. Accordingly, as illustrated in FIGS. 2A and 2B, the phase shifting in the receive operation, in which the input receive signal RS_i is input to the first node ND1 and processed to generate the output receive signal RS_o at the second node ND2; and the transmit operation, in which the input transmit signal TS_i is input at the first node ND1 and processed to generate the output transmit signal TS_o output at the second node ND2, may be performed in the same manner in the direction of the shown arrow.

FIG. 4A illustrates that the receive chain and the transmit chain according to an embodiment of the present disclosure share the first antenna ANT1. Hence, the LNA 102 and the power amplifier 104 may share the first antenna ANT1 in the transceiver 100. In this regard, the transceiver 100 may further include a third switch SW3. The third switch SW3 may be understood as a transmit/receive (T/R) switch. The third switch SW3 may connect the first antenna ANT1 to either the LNA 102 or the power amplifier 104, in response to the mode signal XMD. For example, with the above-noted TDD communication scheme, the receive chain and the transmit chain may be activated at different respective times. When the receive chain is activated, the first antenna ANT1 may receive the receive signal RS and when the transmit chain is activated, the first antenna ANT1 may output the transmit signal TS.

Referring now to the alternative configuration of FIG. 4B, an embodiment of the present disclosure may separately include the first antenna ANT1 for the receive chain and a second antenna ANT2 for the transmit chain. For example, if an area of the overall phased array antenna system or a resource is not considerably restricted, the first antenna ANT1 and the second antenna ANT2 may be separately included for ease of control or for signal accuracy. The first and second antennas ANT1 and ANT2 may each be an antenna included in the antenna array 302 of UE 300 in FIG. 3. In an embodiment, the first and second antennas ANT1 and ANT2 are antenna elements of different respective antenna arrays for transmit and receive operations, respectively.

As described above, the transceiver 100 according to an embodiment of the present disclosure may have a structure optimized for a requisite or desired performance. However, in the following discussion, an example in which the receive chain and the transmit chain share the first antenna ANT1 will be described.

FIGS. 4A and 4B illustrate that only one LNA 102 and power amplifier 104 is included within the transceiver 100. In other examples, two or more LNAs 102 and power amplifiers 104 may be included according to a requisite or desired performance.

Figure 5:
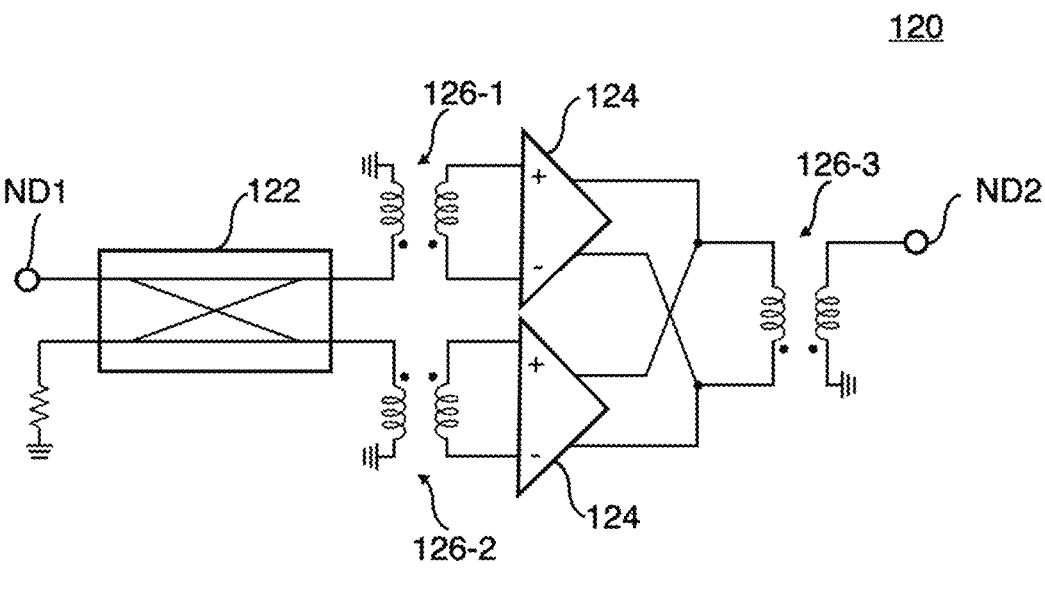
FIG. 5 illustrates a phase shifter according to an embodiment of the present disclosure.

FIG. 5 illustrates the phase shifter 120 according to an embodiment of the present disclosure. In this embodiment, the phase shifter 120 may be a vector sum passive phase shifter, as mentioned above, including a coupler 122 (e.g., a hybrid coupler such as a 3 dB hybrid coupler) and variable gain amplifiers 124.

The input receive signal RS_i and the input transmit signal TS_i input to an input terminal, i.e., first node ND1, may be output by the coupler 122 as single ended signals having a phase difference with respect to each other. For example, coupler 122 may convert the input receive signal RS_i into an In-phase channel (I channel) signal and a Quadrature channel (Q channel) signal having the same amplitude and having a phase difference of 90°. The phase of the I channel signal may be referred to as 0° and the phase of the Q channel signal may be referred to as 90° (or –90°). In the same manner, coupler 122 may convert the input transmit signal TS_i into the I channel signal and the Q channel signal.

The variable gain amplifiers 124 may be included for each of the I channel signal and the Q channel signal. The variable gain amplifiers 124 may amplify and output the corresponding channel signal from the I channel signal and the Q channel signal. To this end, the variable gain amplifiers 124 (VGAs) may adjust the power of the I channel signal and the Q channel signal to a suitable or optimal power for beam forming. It is noted here that in other embodiments, three or more channels and three or more VGAs 124 may be included to realize the phase shifting.

The phase shifter 120 may further include BALanced-to-UNbalanced transformers (baluns) 126-1 and 126-2 interposed between the coupler 122 and the VGAs 124 and a balun 126-3 interposed between the variable gain amplifiers 124 and the second node ND2. The first balun 126-1 and a second balun 126-2 may each convert the corresponding channel signal from the I channel signal and the Q channel signal output from the coupler 122 into a differential signal to be applied to the corresponding VGA 124. The third balun 126-3 may apply the vector sum of the amplified I channel signal and Q channel signal output from the variable gain amplifiers 124 to the second node ND2. The first balun 126-1 through the third balun 126-3 may convert the phase of the corresponding signal to a phase between 0° through 180°. It is noted here that in alternative embodiments, the baluns 126-1 and 126-2 are omitted, or the balun 126-3 is omitted.

With the above configuration, the phase shifter 120 may have a smaller area as compared to prior art configurations that employ resistive variable attenuators. The phase shifter 120 may adjust the strength of the I channel signal and the Q channel signal through the VGAs 124, which are active devices. Accordingly, noise and linearity characteristics may be improved. Also, because the variable gain amplifiers 124 of the phase shifter 120 are shared by the receive chain and the transmit chain, calibration for the variable gain amplifiers 124 may not be required. In this regard, manufacturing/setup processes may be simplified.

Figure 6A:
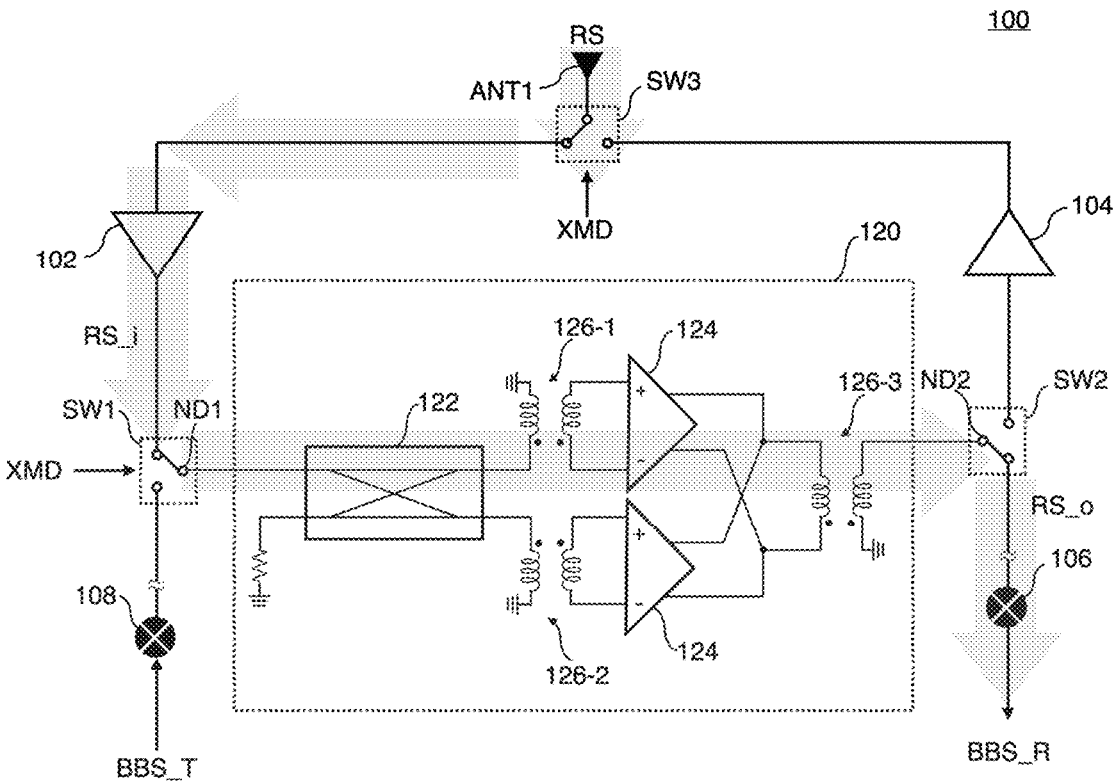
FIGS. 6A and 6B respectively illustrate a receive path and a transmit path of a transceiver including the phase shifter of FIG. 5.
Figure 6B:
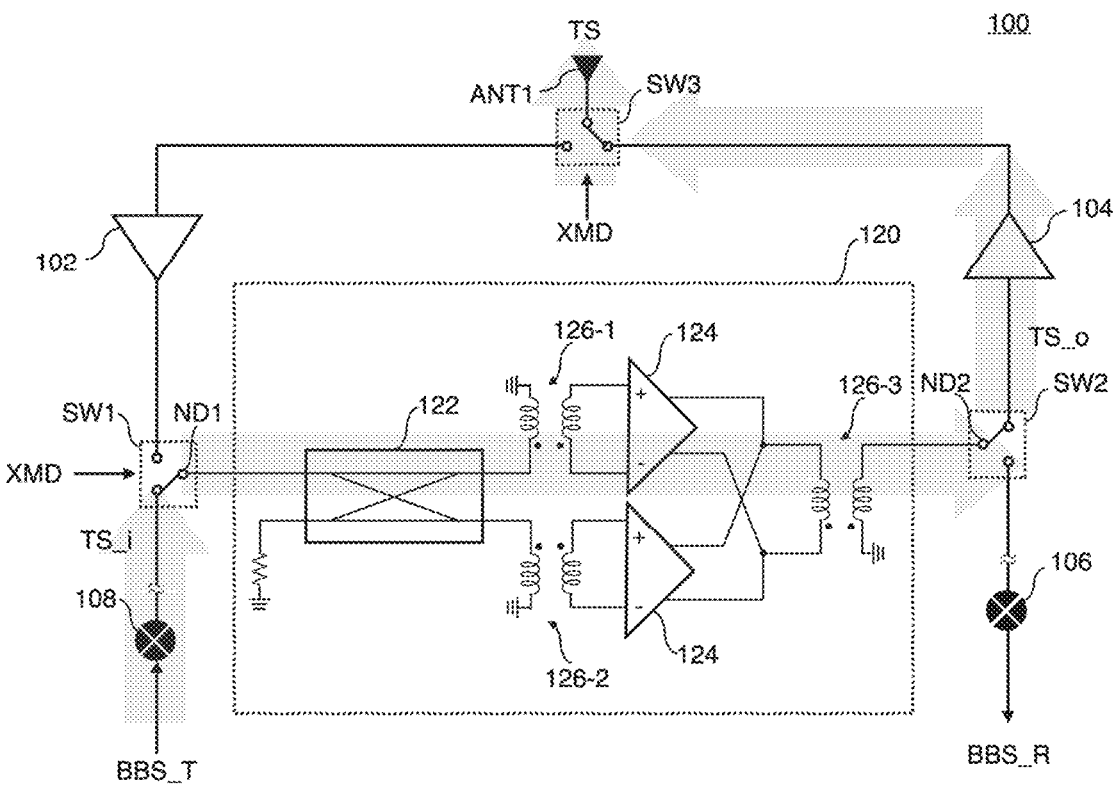

FIGS. 6A and 6B respectively illustrate a receive path and a transmit path of the transceiver 100 including the phase shifter 120 of FIG. 5.

First, referring to FIG. 6A which illustrates the receive path, the first antenna ANT1 of the transceiver 100 may receive the receive signal RS. In response to the mode signal XMD, the third switch SW3 may connect the first antenna ANT1 to the LNA 102. In this regard, the receive signal RS may be amplified by the LNA 102. As the first switch SW1 connects the LNA 102 to the first node ND1, in response to the mode signal XMD, the receive signal RS may be input to the first node ND1 as the input receive signal RS_i which is amplified by the LNA 102.

The input receive signal RS_i may be converted into the I channel signal and the Q channel signal by the coupler 122 connected to the first node ND1. The I channel signal and the Q channel signal may be applied to the variable gain amplifiers 124 by the first balun 126-1 and the second balun 126-2. Differential output signals of the variable gain amplifiers 124 may be vector summed by the third balun 126-3 to thereby generate the output receive signal RS_o. The second switch SW2 may connect the second node ND2 to the receive mixer 106, in response to the mode signal XMD. In this regard, the output receive signal RS_o may be routed to the receive mixer 106 from the second node ND2. The output receive signal RS_o may also be routed to the communication modem 200 of FIG. 3 through the receive mixer 106 as the baseband signal BBS_R (or as a portion of the baseband signal BBS_R when a combiner combines a plurality of output receive signals RS_o prior to the down-conversion).

Referring now to FIG. 6B which illustrates the transmit path, the transmit mixer 108 of the transceiver 100 may receive the baseband signal BBS_T from the communication modem 200 of FIG. 3. The first switch SW1 may connect the transmit mixer 108 to the first node ND1, in response to the mode signal XMD. A signal that is upconverted by the transmit mixer 108 (and optionally divided by a divider after the upconversion) may be input to the coupler 122 as the input transmit signal TS_i.

The input transmit signal TS_i may be converted into the I channel signal and the Q channel signal by the coupler 122. The I channel signal and the Q channel signal may be applied to the variable gain amplifiers 124 by the first balun 126-1 and the second balun 126-2. Differential output signals of the variable gain amplifiers 124 may be vector summed by the third balun 126-3 to be processed as the output transmit signal TS_o. The second switch SW2 may connect the second node ND2 to the power amplifier 104, in response to the mode signal XMD. In this regard, the output transmit signal TS_o may be routed to the power amplifier 104 from the second node ND2. The output transmit signal TS_o may be amplified by the power amplifier 104 to be transmitted through the first antenna ANT1.

Figures 7A, 7B:
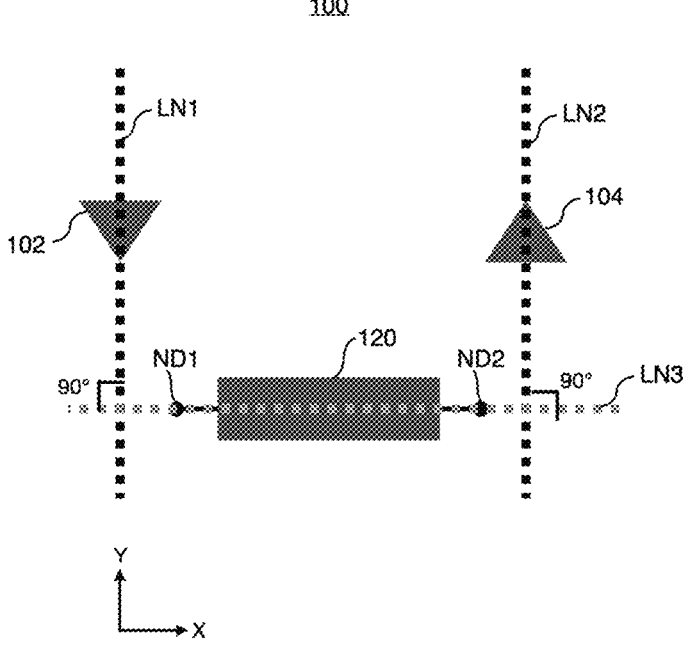
FIGS. 7A and 7B respectively illustrate arrangements of a phase shifter in a transceiver according to an embodiment of the present disclosure.

FIGS. 7A and 7B respectively illustrate arrangements of the phase shifter 120 in the transceiver 100 according to respective embodiments of the present disclosure.

First, referring to FIG. 7A, the phase shifter 120 may be positioned between a first imaginary straight line L1 and a second imaginary straight line L2 in the transceiver 100, where the first line L1 may "connect" the input terminal to the output terminal in the LNA 102 (the input and output terminals are located at points of the line L1) and the second line L2 (which may be parallel to line L1) may "connect" the input terminal to the output terminal in the power amplifier 104. A third imaginary straight line L3 may be perpendicular to the first line L1 and the second line L2, where the third line L3 may "connect" the first node ND1 to the second node ND2, and the input and output terminals of the phase shifter may be located at the first and second nodes ND1 and ND2, respectively. When the LNA 102 and the power amplifier 104 are spaced apart from each other in a first direction (e.g., an X-axis direction), the phase shifter 120 may be positioned such that the third line L3 connecting the first node ND1 to the second node ND2 is a second direction (e.g., a Y-axis direction) which is perpendicular to the first direction.

With this arrangement, the circuitry of the transceiver 100 may be arranged compactly and the area occupied by the transceiver 100 may be minimized.

In other examples, the phase shifter is still located between the same imaginary lines L1 and L2 as in FIG. 7A, but the imaginary line L3 connecting nodes ND1 and ND2 is non-perpendicular to lines L1 and L2, such as in FIG. 7B. As shown in FIG. 7B, the phase shifter 120 has an input and output located at nodes ND1 and ND2, respectively, may be positioned to have a first angle (LA less than 90 degrees) between the third imaginary line L3 and the first imaginary line L1 and/or between the second imaginary line L2.

Figure 8:
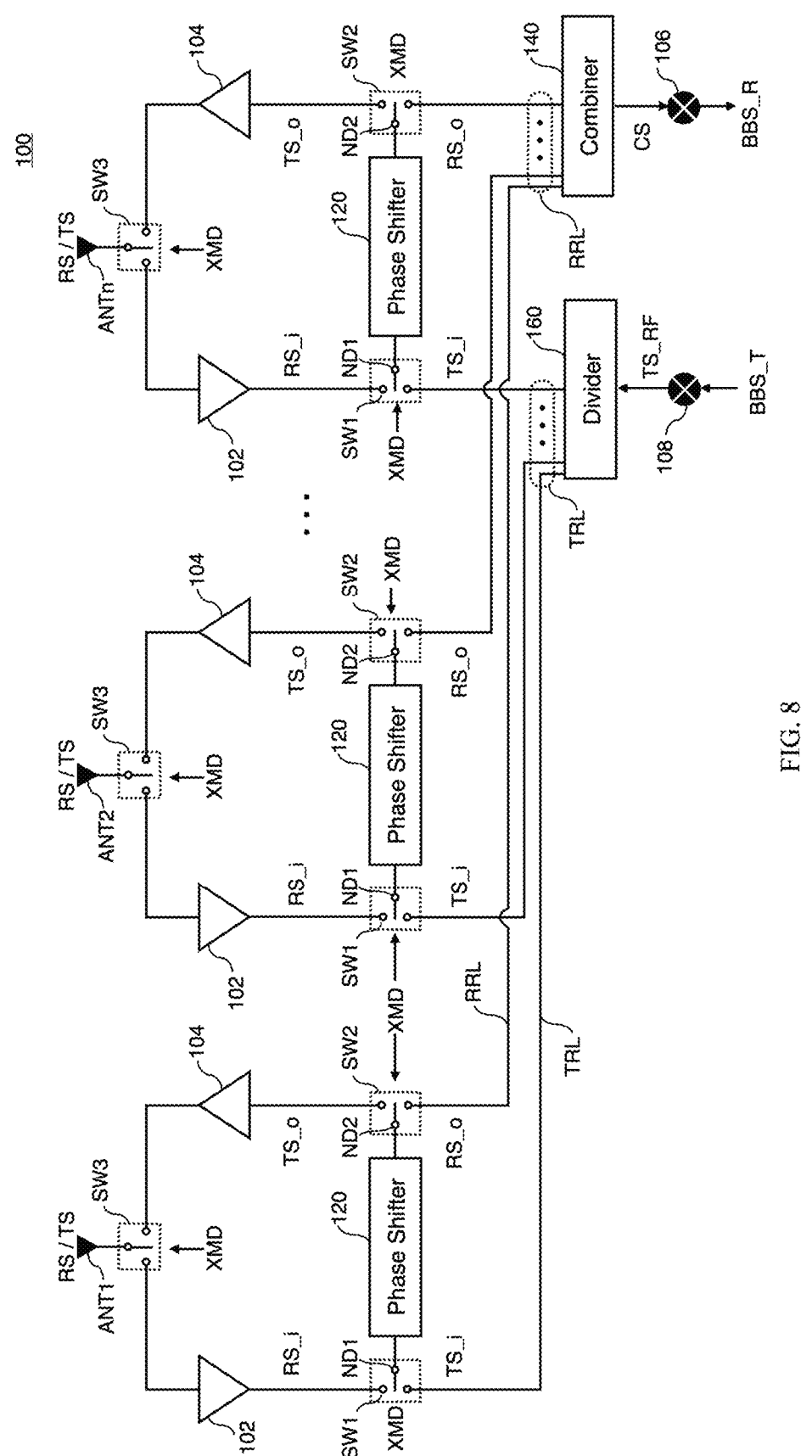
FIG. 8 illustrates a transceiver including a plurality of phase shifters according to an embodiment of the present disclosure.

FIG. 8 illustrates the transceiver 100 including a plurality of the phase shifters 120 according to an embodiment of the present disclosure.

Referring to FIGS. 4A, 4B and 8, the transceiver 100 may include a 1:n divider 160, an n:1 combiner 140, and "n" transmit/receive chains. As described above, each of the n transmit/receive chains may include a phase shifter 120, an LNA 102, a power amplifier 104, and switches SW1 to SW3. The n phase shifters 120 may each be individually RF coupled to one of n antennas ANT1 through ANTn, respectively, in the transceiver 100. Thus, the transceiver 100 may include n pairs of transmit/receive chains each shared by a respective one of the first antenna ANT1 through the nth antenna ANTn. The first antenna ANT1 through the nth antenna ANTn may be antennas included in the antenna array 302 of wireless communication apparatus 300 in FIG. 3. The divider 160 has an input port coupled to an output of the mixer 108, where it receives an input RF transmit signal TS_RF and divides it into n divided transmit signals, each routed to one of the transmit/receive chains through one of n transmit routing lines TRL. In the n pairs of shared transmit/receive chains, in the transmit mode, the first nodes ND1 may each receive one of the divided transmit signals on one of the transmit routing lines TRL as a respective input transmit signal TS_i.

For example, when n=32, the transceiver 100 may include 32 antennas ANT1 to ANT32 and 32 pairs of transmit/receive chains. Therefore, in the transceiver 100, the phase shifter 120 is shared by the receive chain and the transmit chain in the transmit/receive chain and may have a reduced area as compared to prior art transceivers employing two phase shifters for each transmit/receive chains (separate phase shifters for the transmit and receive chains). Further, amplification is performed by using active devices so as to improve noise and linearity characteristics and beam forming effect as described above.

In the receive mode, the combiner 140 may combine n output receive signals RS_o output from the second nodes ND2 of n phase shifters 120 to form one combined signal CS. The combiner 140 may be connected to the second nodes ND2 of n phase shifters 120 by receive routing line RRL. Each of the combiner 140 and divider 160 may be configured with the same or similar design, which may include a hierarchical network of directional couplers, such that the divider 160 provides 1:n dividing and the combiner 140 provides n:1 combining.

In the receive mode, the receive mixer 106 may down-convert the combined signal CS output from the combiner 140 to be output as the baseband signal BBS_R. In the transmit mode, the transmit mixer 108 may upconvert the baseband signal BBS_T to the input RF transmit signal TS_RF, which is input to the divider 160.

Figure 9A:
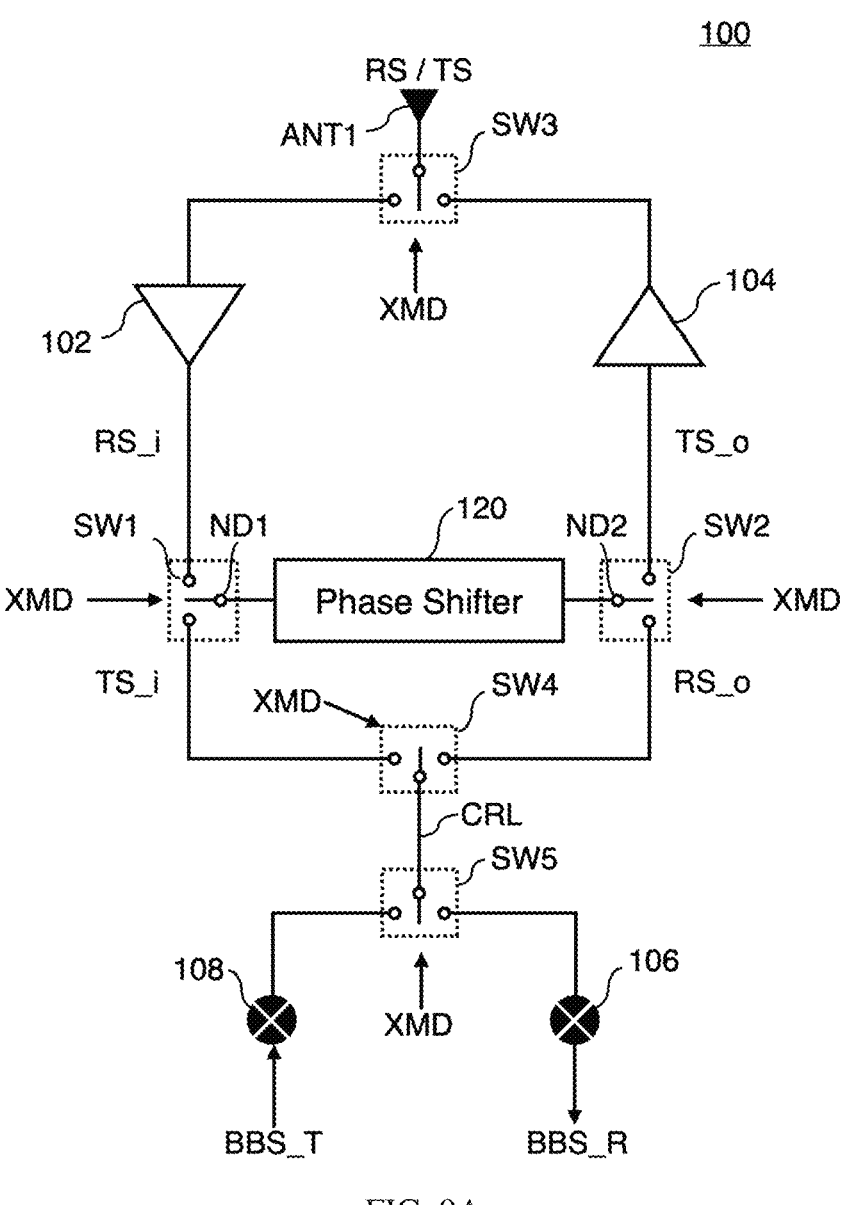
FIG. 9A illustrates a transceiver further including a fourth switch according to an embodiment of the present disclosure.

FIG. 9A illustrates the transceiver 100 further including a fourth switch SW4 according to an embodiment of the present disclosure.

As shown in FIG. 9A, the transceiver 100 may include the LNA 102, the power amplifier 104, the phase shifter 120, the receive mixer 106, the transmit mixer 108, and the first switch SW1 through the third switch SW3 as in FIGS. 4A and 4B. In addition, the transceiver 100 of FIG. 9A may further include the fourth switch SW4.

In response to the mode signal XMD, the fourth switch SW4 may connect the first node ND1 to a common routing line CRL in the transmit mode or may connect the second node ND2 to the common routing line CRL in the receive mode. As a result, in the transceiver 100 of FIG. 9A, common routing line CRL may be shared by the receive chain and the transmit chain. This differs from the transceiver 100 of FIG. 8, in which each transmit/receive chain separately connects to one of the receive routing lines RRL and one of the transmit routing line TRLs. Further, as described below in connection with FIG. 9B, the common routing line concept can be applied to a transceiver with a plurality of transmit/receive chains.

In the single transmit/receive chain example of FIG. 9A, the common routing line CRL may be connected to the receive mixer 106 in the receive mode and the transmit mixer 108 in the transmit mode. To selectively connect the common routing line CRL to either the receive mixer 106 or the transmit mixer 108, in response to the mode signal XMD, the transceiver 100 may further include a fifth switch SW5 which is switched in response to the mode signal XMD.

Figure 9B:
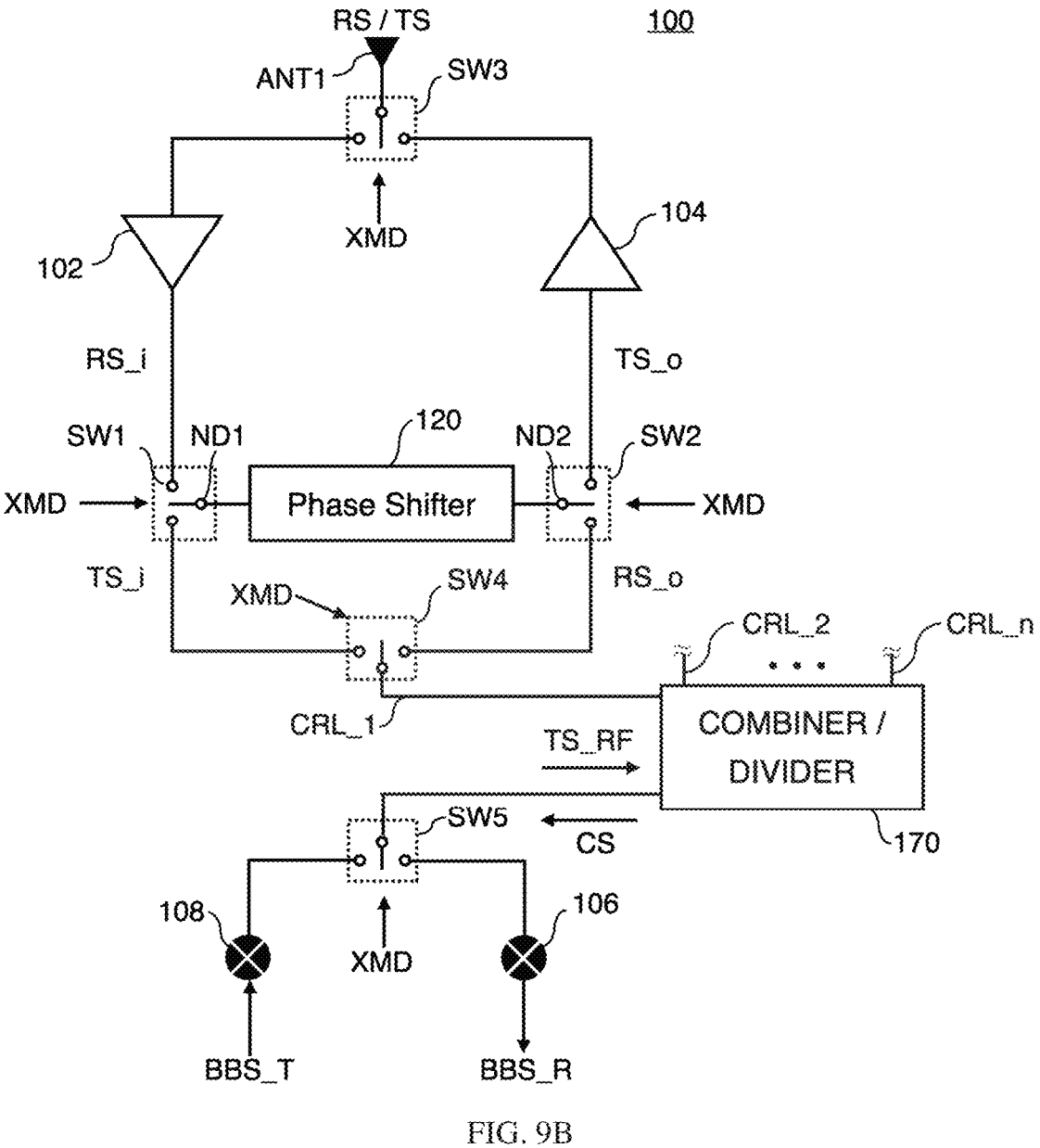
FIG. 9B illustrates a transceiver in which common circuitry operates as both a combiner and a divider and connects to a plurality of transmit/receive chains, according to an embodiment of the present disclosure.

FIG. 9B illustrates an embodiment of the transceiver 100 in which common circuitry ("combiner/divider") 170 operates as both a combiner and a divider and connects to a plurality of transmit/receive chains according to an embodiment of the present disclosure. The transceiver of FIG. 9B includes n transmit/receive chains (n=2 or more) and n antennas ANT1 to ANTn as shown in FIG. 8. The combiner/divider 170 may include one input port connected to the output of the switch SW5, and n output ports connected to n common routing lines CRL_1 to CRL_n, respectively. In the transmit mode, the combiner/divider 170 may divide an input RF transmit signal TS_RF into n divided transmit signals TS_i which are output on the common routing lines CRL_1 to CRL_n, respectively. Each of the divided common routing lines CRL_1 to CRL_n may be connected to an input of a switch SW4 in one of the transmit/receive chains. Thus, in the transmit mode, with the switches SW4 and SW5 controlled by the signal XMD to form transmit paths between the output of the mixer 108 to the inputs of switches SW1 in each transmit/receive chain, the n divided signals may be phase shifted by the phase shifter 120 in each of the transmit/receive chains and routed to the associated antenna ANT. In the receive mode, the switching positions of each of the switches SW4 and SW5 may be changed, to output the receive signals RS_o on the common routing lines CRL_1 to CRL_n, which may be combined by the same (e.g., passive) circuitry within the combiner/divider 170 to produce a the combined receive signal CS.

Because the common routing line CRL in FIG. 9A and the common routing lines CRL_1 to CRL_n in FIG. 9B for the receive operation and the transmit operation is/are shared in the transceiver 100, the number of routing lines may be reduced in half compared to the case where the routing lines are separately included for the receive operation and the transmit operation (as in FIG. 8). Accordingly, an additional reduction in area may be realized in the transceiver 100 embodiments of FIGS. 9A and 9B. Moreover, in the embodiment of FIG. 9B, the area occupied by the combiner/divider 170 may be approximately one half the collective area occupied by the combiner 140 and the divider 160 of FIG. 8. As described above, the receive chain and the transmit chain may be activated during different time slots, which facilitates transmit and receive operations using the same frequencies, if desired.

Figure 10:
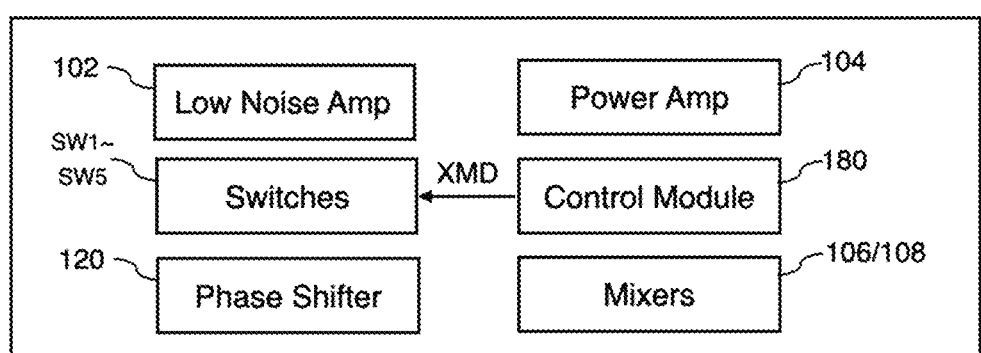
FIG. 10 illustrates a transceiver further including a transmit/receive control module according to an embodiment of the present disclosure.

FIG. 10 illustrates the transceiver 100 further including transmit/receive control circuitry ("module") 180 according to an embodiment of the present disclosure.

Referring to FIG. 10, the transceiver 100 may include the LNA 102, the power amplifier 104, the phase shifter 120, the receive mixer 106, the transmit mixer 108, and the first switch SW1 through the third switch SW3 as in FIG. 4. In addition, the transceiver 100 of FIG. 10 may further include the transmit/receive control module 180. Unlike FIG. 3, the transceiver 100 of FIG. 10 may not receive the mode signal XMD from the communication modem 200 but instead, may generate the mode signal XMD through the transmit/receive control module 180 disposed therein.

The transmit/receive control module 180 may generate the mode signal XMD and transmit the mode signal XMD to the first switch SW1 and the second switch SW2. When the transceiver 100 further includes the third switch SW3, fourth switch SW4, and the fifth switch SW5 as in FIGS. 9A and 9B, the transmit/receive control module 180 may generate the mode signal XMD and transmit the mode signal XMD to the third switch SW3, fourth switch SW4, and/or the fifth switch SW5. As the mode signal XMD is generated and transmitted from within the transceiver 100, switching operation speed of the first switch SW1 through the fifth switch SW5 may be improved.

The transmit/receive control module 180 may receive the beam forming control signal XBM through the communication modem 200 of FIG. 3 to generate the mode signal XMD. The beam forming control signal XBM may be the same as that described above with reference to FIG. 3.

In embodiments of a transceiver and a wireless communication apparatus including the same according to the present disclosure, a phase shifter having a uni-directional characteristic is shared by the transmit/receive chain(s) so that a chip area may be reduced and linearity or noise characteristic may be maintained or improved.

Although representative embodiments of the present disclosure have been described in detail, those of ordinary skill in the art to which the present disclosure pertains will understand that various modifications are capable of being made to the above-described embodiments without departing from the scope the present disclosure as defined by the appended claims and their equivalents.

What is claimed is:

1. A transceiver comprising:
a phase shifter configured to:
adjust phase of a receive signal input at a first node of the phase shifter to provide an output receive signal at a second node of the phase shifter in a receive mode; and
adjust phase of a transmit signal input at the first node to provide an output transmit signal at the second node in a transmit mode,
wherein the phase shifter comprises:
a coupler configured to output the receive signal and the transmit signal input to an input terminal as single ended signals having a phase difference with respect to each other;
variable gain amplifiers configured to amplify and output a corresponding one of the single ended signals, which is output from an output terminal of the coupler; and
at least one balun between the coupler and the variable gain amplifiers or between the variable gain amplifiers and the second node.

2. The transceiver of claim 1, further comprising:
a low noise amplifier configured to amplify the output receive signal, which is received from a corresponding antenna within an antenna array, and output an amplified output receive signal to the phase shifter in the receive mode;
a receive mixer configured to downconvert the output receive signal output from the phase shifter in the receive mode;
a transmit mixer configured to upconvert a signal to thereby generate the output transmit signal in the transmit mode; and
a power amplifier configured to amplify the transmit signal output from the phase shifter and output the amplified output transmit signal to an associated antenna from the antenna array in the transmit mode.

3. The transceiver of claim 2, further comprising:

a first switch configured to connect the first node of the phase shifter to one of the low noise amplifier or the transmit mixer, in response to a mode signal; and a second switch configured to connect the second node of the phase shifter to one of the receive mixer or the power amplifier, in response to the mode signal.

4. The transceiver of claim 3, further comprising transmit/ receive control circuitry configured to generate the mode signal and to transmit the mode signal to the first switch and the second switch.

5. The transceiver of claim 3, wherein the low noise amplifier and the power amplifier share a first antenna from the antenna array, and the transceiver further comprising a third switch configured to connect the first antenna to one of the low noise amplifier or the power amplifier, in response to the mode signal.

6. The transceiver of claim 2, wherein the phase shifter is positioned between a first imaginary straight line connecting an input terminal to an output terminal of the low noise amplifier and a second imaginary straight line connecting an input terminal to an output terminal of the power amplifier.

7. The transceiver of claim 6, wherein the phase shifter has an input at the first node and an output at the second node, and the phase shifter is positioned such that a third imaginary straight line connects the first node to the second node, the third imaginary straight line being perpendicular to the first imaginary straight line and the second imaginary straight line.

8. The transceiver of claim 6, wherein the phase shifter has an input at the first node and an output at the second node, and the phase shifter is positioned such that a third imaginary straight line connects the first node to the second node, the third imaginary straight line being non-perpendicular to each of the first imaginary straight line and the second imaginary straight line.

9. The transceiver of claim 2, wherein the low noise amplifier and the power amplifier are spaced apart from each other in a first direction, and the phase shifter is positioned such that an imaginary straight line connects the first node to the second node in a second direction which is perpendicular to the first direction.

10. The transceiver of claim 2, further comprising a fourth switch connecting the first node to a common routing line or the second node to the common routing line, in response to a mode signal.

11. The transceiver of claim 1, wherein the phase shifter is one of a plurality of phase shifters, each coupled to a corresponding antenna included in an antenna array, and each outputting an output receive signal in the receive mode, and in the transmit mode, each receiving a transmit signal.

12. The transceiver of claim 11, further comprising:

a combiner configured to combine the output receive signal output from the plurality of phase shifters to provide a combined signal in the receive mode; and a divider configured to divide one signal into the transmit signals input to the plurality of phase shifters in the transmit mode.

13. A transceiver comprising: a receive chain configured to receive a receive signal of a first frequency band through an antenna; and a transmit chain configured to transmit a transmit signal through an antenna, wherein the receive chain and the transmit chain share a phase shifter, wherein the receive chain comprises a receive mixer configured to downconvert the receive signal output from the phase shifter into a baseband receive signal in a receive mode; wherein the transmit chain comprises a transmit mixer configured to upconvert the baseband receive signal to thereby generate the transmit signal in a transmit mode; and wherein the transceiver further comprises: a first switch configured to selectively connect an input node of the phase shifter to a low noise amplifier or the transmit mixer; and a second switch configured to selectively connect an output node of the phase shifter to the receive mixer or a power amplifier, wherein the phase shifter comprises: a coupler configured to output the receive signal and the transmit signal input to an input terminal as single ended signals having a phase difference with respect to each other; variable gain amplifiers configured to amplify and output a corresponding one of the single ended signals, which is output from an output terminal of the coupler; and at least one balun between the coupler and the variable gain amplifiers or between variable gain amplifiers and the output node.

14. The transceiver of claim 13, wherein when the receive chain is activated, the phase shifter adjusts the phase of the receive signal, which is input to an input node to be output from the output node, and when the transmit chain is activated, the phase shifter adjusts the phase of the transmit signal input to the input node to be output from the output node.

15. The transceiver of claim 13, wherein the receive chain further comprises a low noise amplifier configured to amplify the receive signal received from the antenna and transmit the amplified receive signal to the phase shifter, the transmit chain further comprises a power amplifier configured to amplify the transmit signal, which is output from the phase shifter, and to output the amplified transmit signal to the antenna, and the low noise amplifier and the power amplifier are spaced apart from each other in a first direction.

16. The transceiver of claim 15, wherein the vector sum passive phase shifter is positioned such that an imaginary straight line connecting an input node to an output node to is in a second direction which is perpendicular to the first direction.

17. A wireless communication apparatus comprising:

a transceiver configured to operate in one of a receive mode or a transmit mode at a given time, in response to a mode signal; and a communication modem configured to generate the mode signal and provide the mode signal to the transceiver, wherein the transceiver comprises a phase shifter configured to adjust phase of a receive signal input at a first node of the phase shifter to provide an output receive signal at a second node of the phase shifter in the receive mode, and to adjust phase of a transmit signal input at the first node to provide an output transmit signal at the second node in the transmit mode, and wherein the shared vector sum passive phase shifter comprises:

a coupler configured to output the receive signal and the transmit signal input to an input terminal as single ended signals having a phase difference with respect to each other;

variable gain amplifiers configured to amplify and output a corresponding one of the single ended signals, which is output from an output terminal of the coupler; and at least one balun between the coupler and the variable gain amplifiers or between the variable gain amplifiers and the second node.

18. The wireless communication apparatus of claim 17, wherein the communication modem generates the mode signal based on a beam forming control signal received from an exterior base station through a Physical Downlink Control Channel (PDCCH).

\* \* \* \* \*